United States Patent
Maitland et al.

(10) Patent No.: US 9,634,886 B2
(45) Date of Patent: Apr. 25, 2017

(54) METHOD AND APPARATUS FOR PROVIDING TENANT REDUNDANCY

(71) Applicant: ALCATEL LUCENT, Boulogne-Billancourt (FR)

(72) Inventors: Roger J. Maitland, Woodlawn (CA); Rebecca A. Lantz, Ottawa (CA); Yvon Gilbert, Gatineau (CA); Branka Dzerdz, Kanata (CA)

(73) Assignee: Alcatel Lucent, Boulogne-Billancourt (FR)

(*) Notice: Subject to any disclaimer, the term of this patent is extended or adjusted under 35 U.S.C. 154(b) by 562 days.

(21) Appl. No.: 13/803,663

(22) Filed: Mar. 14, 2013

(65) Prior Publication Data
US 2014/0280821 A1 Sep. 18, 2014

(51) Int. Cl.
*H04L 12/24* (2006.01)

(52) U.S. Cl.
CPC ............... *H04L 41/0668* (2013.01)

(58) Field of Classification Search
CPC ........... H04L 41/0668; H04L 29/08144; H04L 29/08; H04L 29/06; H04L 67/1097; H04L 67/42; G06F 9/45558; G06F 9/45533; G06F 11/3006; G06F 11/3003; G06F 11/3034; G06F 11/3037; G06F 11/3048; G06F 11/301; G06F 11/3082; G06F 11/3089; G06F 11/3495; G06F 11/3476
See application file for complete search history.

(56) References Cited

U.S. PATENT DOCUMENTS

| | | | |
|---|---|---|---|
| 8,732,310 B2* | 5/2014 | Breitgand et al. ............ 709/226 |
| 2011/0106757 A1 | 5/2011 | Pickney et al. |
| 2011/0106802 A1 | 5/2011 | Pinkney et al. |
| 2011/0276951 A1* | 11/2011 | Jain .............................. 717/140 |
| 2012/0102199 A1 | 4/2012 | Hopmann et al. |
| 2012/0137001 A1 | 5/2012 | Ferris |
| 2012/0147894 A1* | 6/2012 | Mulligan et al. ........ 370/395.53 |
| 2012/0179817 A1* | 7/2012 | Bade et al. ................... 709/225 |
| 2013/0007183 A1 | 1/2013 | Sorenson, II |
| 2013/0024567 A1* | 1/2013 | Roxburgh et al. ............ 709/224 |
| 2013/0031294 A1* | 1/2013 | Feng et al. ........................ 711/6 |
| 2013/0042115 A1 | 2/2013 | Sweet |
| 2013/0073806 A1 | 3/2013 | Xavier et al. |
| 2013/0111036 A1 | 5/2013 | Ozawa et al. |
| 2013/0142201 A1 | 6/2013 | Kim et al. |
| 2013/0290541 A1 | 10/2013 | Hatasaki et al. |
| 2014/0068602 A1* | 3/2014 | Gember et al. .................... 718/1 |

(Continued)

OTHER PUBLICATIONS

PCT International Search Report dated Jun. 9, 2014 (PCT/CA2014/050203) 3 pages.

(Continued)

*Primary Examiner* — Saket K Daftuar
(74) *Attorney, Agent, or Firm* — Kramer & Amado, P.C.

(57) ABSTRACT

Various embodiments provide a method and apparatus for providing a tenant redundancy architecture that does not require reserving a complete set of duplicate resources, pushing complexity into the application domain or require the application to communicate simultaneously with two active tenant instances. In particular, a shadow tenant is created that has the functionality of the service tenant but is hidden from the rest of the network until activated.

23 Claims, 6 Drawing Sheets

(56) References Cited

U.S. PATENT DOCUMENTS

| | | | |
|---|---|---|---|
| 2014/0140221 A1* | 5/2014 | Manam et al. | 370/250 |
| 2014/0146055 A1* | 5/2014 | Bala et al. | 345/501 |
| 2014/0149492 A1* | 5/2014 | Ananthanarayanan et al. | 709/203 |
| 2014/0149591 A1* | 5/2014 | Bhattacharya et al. | 709/226 |
| 2014/0149983 A1* | 5/2014 | Bonilla et al. | 718/1 |
| 2014/0165063 A1* | 6/2014 | Shiva et al. | 718/1 |
| 2014/0359616 A1* | 12/2014 | Nakashima et al. | 718/1 |

OTHER PUBLICATIONS

Written Opinion of International Searching Authority dated Jun. 9, 2014 (PCT/CA2014/050203) 4 pages.
"Supplementary Partial European Search report for EP Application No. 14763404 dated Nov. 22, 2016".

* cited by examiner

300

400

600

METHOD AND APPARATUS FOR PROVIDING TENANT REDUNDANCY

TECHNICAL FIELD

The invention relates generally to methods and apparatus for providing redundancy of network components.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known redundancy solutions, an N+1 architecture is used to provide redundant resources.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections Various embodiments provide a method and apparatus for providing a tenant redundancy architecture that does not require reserving a complete set of duplicate resources, pushing complexity into the application domain or require the application to communicate simultaneously with two active tenant instances. In particular, a shadow tenant is created that has the functionality of the service tenant but is hidden from the rest of the network until activated.

In a first embodiment, an apparatus is provided for providing tenant redundancy. The apparatus includes a data storage; and a processor communicatively connected to the data storage. The processor is programmed to: create a service providing tenant instance, create a shadow tenant instance, determine an indication of a switch-over event; and switch over handling of the cloud element service from the service providing tenant instance to the shadow tenant instance based on the switch-over event. The service providing tenant instance being configured to: communicatively connect to a network providing a network service; and provide a cloud element service associated with the network service. The shadow tenant instance being configured to: be communicatively hidden from the network; and provide the cloud element service associated with the network service.

In a second embodiment, a system is provided for providing tenant redundancy, the system comprising: a cloud element manager; a service providing tenant instance communicatively connected to the cloud element manager, and a shadow tenant instance communicatively connected to the cloud element manager. The service providing instance being configured to: communicatively connect to a network providing a network service; and provide a cloud element service associated with the network service. The shadow tenant instance being configured to: be communicatively hidden from the network; and provide the cloud element service associated with the network service. Wherein the cloud element manager is configured to: create the service providing tenant instance and the shadow tenant instance; determine an indication of a switch-over event; and switch over handling of the cloud element service from the service providing tenant instance to the shadow tenant instance based on the switch-over event.

In a third embodiment, a method is provided for providing tenant redundancy. The method includes: creating a service providing tenant instance, creating a shadow tenant instance, determining an indication of a switch-over event; and switching over handling of the cloud element service from the service providing tenant instance to the shadow tenant instance based on the switch-over event. The service providing tenant instance being configured to: communicatively connect to a network providing a network service; and provide a cloud element service associated with the network service. The shadow tenant instance being configured to: be communicatively hidden from the network; and provide the cloud element service associated with the network service.

In a fourth embodiment, a computer-readable storage medium is provided for storing instructions which, when executed by a computer, cause the computer to perform a method. The method includes: creating a service providing tenant instance, creating a shadow tenant instance, determining an indication of a switch-over event; and switching over handling of the cloud element service from the service providing tenant instance to the shadow tenant instance based on the switch-over event. The service providing tenant instance being configured to: communicatively connect to a network providing a network service; and provide a cloud element service associated with the network service. The shadow tenant instance being configured to: be communicatively hidden from the network; and provide the cloud element service associated with the network service.

In some embodiments, the service providing instance is configured with a first plurality of resources and the shadow tenant instance is configured with a second plurality of resources; and wherein the second plurality of resources comprises substantially less resources than the first plurality of resources.

In some embodiments, the service providing instance is configured with a first plurality of virtual machines, the first plurality of virtual machines comprising a first root virtual machine and the shadow tenant instance is configured with a second plurality of virtual machines, the second plurality of virtual machines comprising a second root virtual machine.

In some embodiments, the first root virtual machine is configured to translate one or more first application requirements into a first configuration of the first plurality of virtual machines and the second root virtual machine is configured to translate one or more second application requirements into a second configuration of the second plurality of virtual machines.

In some embodiments, the first root virtual machine is configured to monitor a plurality of first load levels associated with at least a portion of the first plurality of virtual machines and control elasticity of the first plurality of virtual machines based on at least a portion of the plurality of first load levels and the second root virtual machine is configured to monitor a plurality of second load levels associated with at least a portion of the second plurality of virtual machines and control elasticity of the second plurality of virtual machines based on at least a portion of the plurality of second load levels.

In some embodiments, the processor is further programmed to: determine a roll-back condition; and roll-back the switch over.

In some embodiments, the processor is further programmed to: control a transition from at least one of: a first shadow management phase to a second shadow management phase; or a first shadow management step to a second shadow management step.

In some embodiments, the transition control comprises at least one of configuring the processor to: synchronize the service providing tenant instance and the shadow tenant instance with the second shadow management phase; or synchronize the service providing tenant instance and the shadow tenant instance with the second shadow management step.

In some embodiments, the transition control further comprises configuring the processor to: send a first shadow action plan to the service providing tenant instance; and send a second shadow action plan to the shadow tenant instance.

In some embodiments, the processor is further programmed to: receive an input from at least one of a network element or an external management system. Where the control of the transition is based on the input.

In some embodiments, the switch over handling of the cloud element service includes programming the processor to: communicatively hide the service providing tenant instance from the network; and communicatively connect the shadow tenant instance to the network.

In some embodiments, communicatively hiding the service provide instance includes programming the processor to: switch at least one of the network interfaces of the service providing tenant instance to a dummy VLAN.

In some embodiments, the cloud element manager is further configured to: send a first shadow action plan to the service providing tenant instance; and send a second shadow action plan to the shadow tenant instance. Where the service providing tenant instance is configured to invoke one or more first actions based on the first shadow action plan; and where the shadow tenant instance is configured to invoke one or more second actions based on the second shadow action plan.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, the various embodiments described herein are not necessarily mutually exclusive, as some embodiments may be combined with one or more other embodiments to form new embodiments.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

Various embodiments provide a method and apparatus for providing a tenant redundancy architecture that does not require reserving a complete set of duplicate resources, pushing complexity into the application domain or require the application to communicate simultaneously with two active tenant instances. In particular, a shadow tenant is created that has the functionality of the service tenant but is hidden from the rest of the network until activated.

Advantageously, the tenant redundancy architecture may be used in different scenarios such as graceful reset of the tenant, software upgrade of tenant applications, tenant configuration changes, tenant virtual machine change and geo-redundancy.

Figure 1:
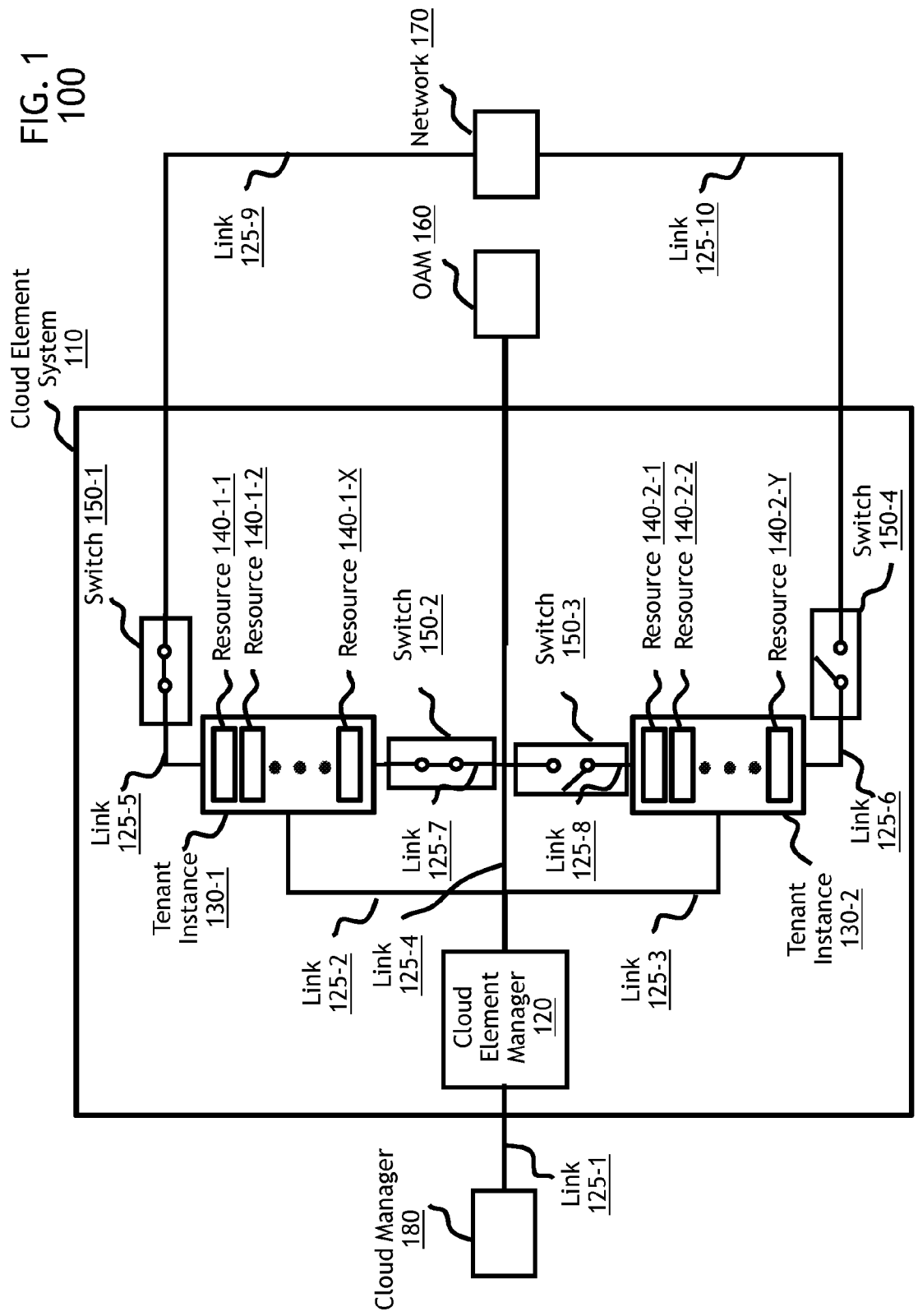
FIG. 1 illustrates a tenant redundancy system 100 that includes an embodiment of a cloud element system 110 for providing tenant redundancy.

FIG. 1 illustrates a tenant redundancy system 100 that includes an embodiment of a cloud element system 110 for providing tenant redundancy. The tenant redundancy system 100 includes a cloud element system 110 that provides functionality of at least one cloud element to optionally OAM 160 or network 170 and optionally interacts with cloud manager 180.

Cloud element system 110 includes cloud element manager 120, and tenant instances 130-1-130-2 (collectively, tenant instances 130). Switches 150-1-150-4 (collectively, switches 150) are illustrative of an associated one of tenant instances 130 being communicatively connected to OAM 160 or network 170 and may be logical rather than physical switches.

Cloud element manager 120 may be apparatus capable of orchestrating resources for tenant instances 130, connectivity between tenant instances 130 and OAM 160 or network 170 and interacting with cloud manager 180.

As defined herein, a "tenant" is broadly construed as a collection of resources providing functionality of a cloud element (e.g., a network node or network element providing functionality to network 170). As defined herein, a "tenant instance" represents one instance of the cloud element and includes all resources necessary to provide functionality of a working and functioning cloud element. Resources may be any suitable device utilized by a tenant instance to provide the functionality of the cloud element. For example, resources may be: servers, processor cores, memory devices, storage devices, networking devices or the like.

Tenant instances 130 include at least one service providing tenant instance (e.g., tenant instance 130-1) that provides the functionality of the cloud element and at least one shadow tenant instance (e.g., tenant instance 130-2) that provides redundancy to the service providing tenant instance. In particular, tenant instances 130 are configured with resources 140-1-1-140-1-X and 140-2-1-140-2-Y (collectively, resources 140). It should be appreciated that while two tenant instances are illustrated here, system 110 may include more tenant instances. It should also be appreciated that resources 140 may include more or fewer resources than illustrated.

It should be appreciated that since a tenant instance is a virtual construct, a tenant instance, and in particular a shadow tenant instance, may consume significantly less physical resources before being activated. As such, since only service providing tenant instances are active, physical resource consumption may be substantially constrained to that of the service providing instance(s).

Advantageously, the shadow tenant instance may allow the ability to execute operational procedures with less impact to provided service as compared with N+1 solutions and rapidly switch between the two tenant instances when the procedures are complete.

Links 125-1-125-10 (collectively, links 125) illustrate communication paths between system components and should be broadly construed to include any suitable communication path. For example, a link may be an internal communication channel between components in the same device or support communicating over one or more communication channels such as: wireless communications (e.g., LTE, GSM, CDMA, Bluetooth); WLAN communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, links 125 may be any number or combinations of communication channels.

OAM 160 may be any apparatus capable of OAM capabilities associated with the cloud element represented by tenant instances 130. OAM manager may be communicatively connected to cloud manager 120, tenant instances 130 or both.

Network 170 may be any network associated with the cloud element represented by tenant instances 130. For example, network 170 may be a telecommunications network such as a WCDMA or GSM network. In this example, tenant instances 130 may function as an RNC or BSC respectively.

Cloud manager 180 may be any cloud system manager for managing virtual infrastructure. For example, cloud manager 180 may be a VMware vCenter server.

In some embodiments, one or more of tenant instances 130 exist in a separate cloud infrastructures or in a geographically remote location.

In some embodiments, one or more tenant instances 130 acting as a shadow tenant is hidden from network 170 until activated by cloud element manager 120.

In some embodiments, one or more of tenant instances 130 acting as a shadow tenant instance is configured with substantially less resources as compared to the service providing instance. In particular, the shadow tenant instance is configured with all of the resources necessary to provide the functionality of the cloud element, but to conserve resources within the cloud infrastructure, the shadow tenant instance is configured with less resources than the service providing instance. Once a switch-over occurs, the shadow tenant instance becomes a service providing tenant instance and uses conventional elasticity to grow or shrink the size of the tenant instance. As used herein, "substantially less resources" is broadly construed as fifty percent (50%) or less of any type of resource requirement (e.g., fifty percent less virtual machines, memory, storage, or processing).

In some embodiments, the shadow tenant instance has substantially less virtual machines than the service providing tenant instance.

In some embodiments, the shadow tenant instance has substantially less physical resources (e.g., less cpu cycle or memory) than the service providing tenant instance.

In some embodiments, the shadow tenant instance contains a complete set of virtual resources (e.g., VMs or vSwitches), but has substantially less resources. It should be appreciated that since the shadow tenant instance is hidden, the shadow instance may include substantially less resources since inactive virtual resources consume substantially less cpu time and memory.

In some embodiments of switches 150, to switch an interface off, the external portGroups of a tenant instance are configured to a dummy VLAN that is closed within cloud element system 110.

In some embodiments of switches 150, to switch an interface on, the external portGroups of a tenant instance are configured as provisioned to communicate with OAM 160 or network 170.

In some of these embodiments, the configuration of external portGroups of a tenant instance is accomplished by interacting with a cloud manager (e.g. cloud element manager 120 interacting with cloud manager 180 of FIG. 1).

In some of these embodiments, the configuration of external portGroups of a tenant instance is accomplished by the tenant instance (e.g., cloud element manager 120 interacting with one of tenant instances 130 of FIG. 1).

Advantageously, operational procedures based on cloud element system 110 may be performed with less impact on the provided service of the cloud element. Operational procedures include, for example: (i) graceful reset of a cloud element (e.g., the tenant); (ii) software upgrade; (iii) cloud element configuration changes; (iv) cloud element virtual machine changes; and (v) geo-redundancy.

Figure 2:
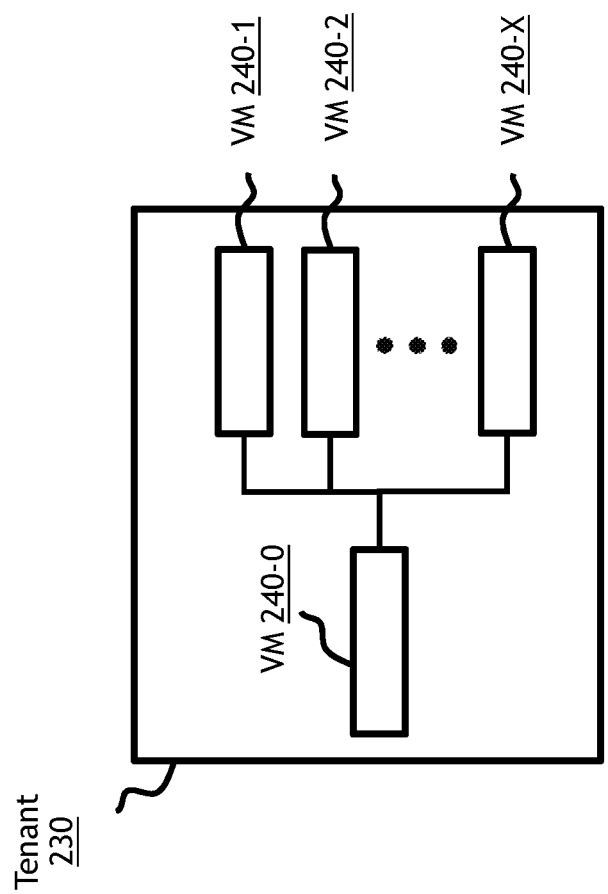
FIG. 2 schematically illustrates a tenant instance 230 that is an embodiment of one of tenant instances 130 of FIG. 1.

FIG. 2 schematically illustrates a tenant instance 230 that is an embodiment of one of tenant instances 130 of FIG. 1. The tenant instance 230 includes virtual machines VM 240-0-VM 240-X (collectively, VMs 240). VMs 240 provide the resources required to service requests directed to the tenant instance (e.g., the cloud element).

VM 240-0, i.e., the root virtual machine, is the application coordinator and interacts with the VM management system during initial build-out of the application and during grow and de-grow situations. In particular, the root VM 240-0 has the capability to translate application requirements into specific configuration of VMs 240. For example, a wireless network controller may be specified by the wireless operator as having to handle a given number of cell sites and the root VM is responsible for converting this application level requirement into a required VM configuration such as configuring n VMs of type VM(a) and m VMs of type VM(b).

Advantageously, the root VM allows scalability and management of large cloud applications comprising hundreds or thousands of VMs.

In some embodiments, VM 240-0 is responsible for controlling elasticity of complex applications by monitoring load levels in individual VM 240s and translating these loads into configuration requests for specific VM types.

In some embodiments of VM 240-0, the root virtual machine is a one-to-one spared configuration with a single active instance communicating with the VM management system.

Figure 3:
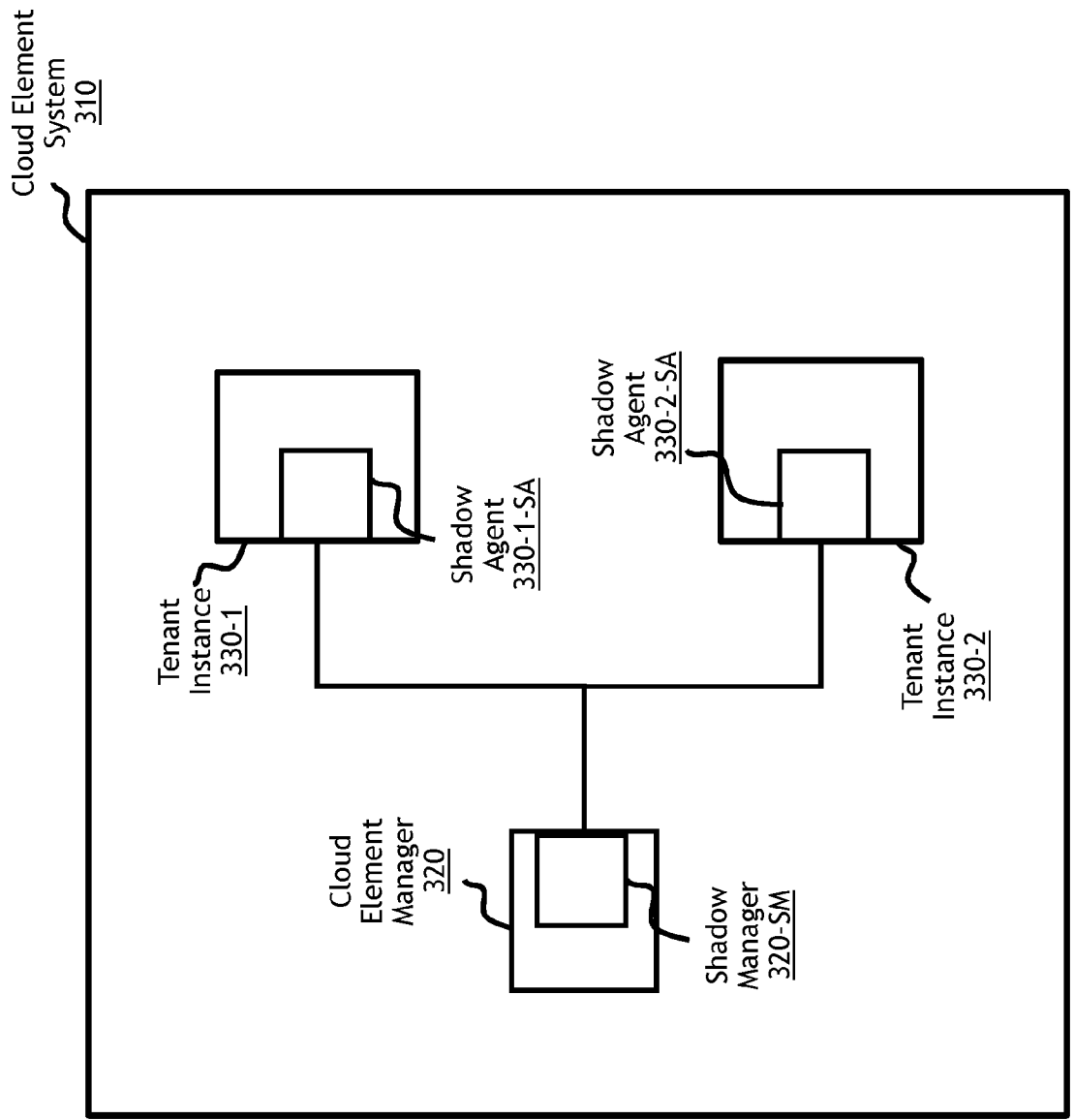
FIG. 3 schematically illustrates a cloud element system 310 that is an embodiment cloud element system 110 of FIG. 1.

FIG. 3 schematically illustrates a cloud element system 310 that is an embodiment of cloud element system 110 of FIG. 1. The cloud element system 310 includes a cloud element manager 320 and tenant instances 330-1 and 330-2 (collectively, tenant instances 330) as described above in FIG. 1. The cloud element manager includes a shadow manager 320-SM for communicating with tenant instances 330-1 and 330-2 via associated shadow agents 330-1-SA and 330-2-SA (collectively, shadow agents 330-SA).

Shadow manager 320-SM controls the phases of the shadow management process, and the steps and states within each phase. In particular, shadow manager 320-SM synchronizes the phases, steps or states of the shadow management process with the tenant instances (e.g., tenant instances 130 of FIG. 1) and advances the phase, step or state based on a determination that the tenant instances are synchronized. Shadow management process phases may be any suitable phases defined by the system such as: (i) creation of service providing tenant instance; (ii) creation of shadow tenant instance; (iii) de-activate service providing tenant instance; (iv) activate shadow tenant instance; (v) switch over service to shadow tenant instance; (vi) roll-back service; (vii) removal of old service providing tenant instance; or (viii) the like.

Shadow agents 330-SA provide a bridge between the shadow manager 320-SM and the tenant instance specific actions associated with the steps and states of the Shadow Management process.

In some embodiments, shadow manager 320-SM exchanges messages related to the phases, steps or states of the shadow management process with tenant instances 330 (e.g., tenant instances associated with the same tenant). Message may include, for example: (i) sending configuration information of the steps in each phase and the correct order of those steps; (ii) sending information of the current phase or step or state of the current phase; (iii) receiving feedback on the status of whether the steps in phase are advancing properly; (iv) sending configuration information switching the external connections; (v) sending one or more shadow action plans; or (vi) the like. A shadow action plan may be any directive specifying actions the shadow agent should implement for a corresponding step or phase of the shadow management process.

In some embodiments, the shadow action plan may be a binary or a script.

In some embodiments, shadow Manager 320-SM maintains a state machine for tenant instances 330. In some of these embodiments, the state machine changes phase or state based on external inputs (e.g. OAM actions from OAM 160 of FIG. 1). In some of these embodiments, the state machine executes actions based on any suitable condition such as: (i) received external inputs; (ii) changes of phase or state; or (iii) the like. Actions may be any suitable action and may include sending message(s) to one or more of tenant instances 330.

In some embodiments, shadow agents 320-SA invoke actions based on messages received from shadow manager 320-SM. Invoked actions may be any suitable action such as tenant specific actions corresponding to the phase or state of the shadow management process. For example, an invoked action may specify an action to be performed by one or more of the virtual machines of the tenant instance (e.g., one or more of VMS 240 of FIG. 2).

In some embodiments, shadow manager 320-SM provides a set of APIs to one or more of tenant instances 330. APIs may be configured for any suitable purpose such as the configuration or reconfiguration of a tenant instance or for the configuration of actions to be executed on the tenant instance (e.g., an action to be performed by one of the tenant instances based on a received message(s) from shadow manager 320-M).

In some embodiments, APIs are used by the root VMs (e.g., VM 240-0 of FIG. 2) to initiate actions on the virtualization platform (e.g., the vSphere virtualization platform). Actions may be any suitable action such as, for example: (i) creation or deletion of VMs, (ii) VM status management, (iii) networking components management, (iv) DRS rules, (v) resource reservation; or (vi) the like. Advantageously, the use of APIs may isolate the usage of virtualization platform specific functions and to allow support for multiple virtualization technologies.

In some embodiments, shadow manager 320-SM configures the tenant instance according to tenant deployment rules.

In some embodiments, shadow manager 320-SM interfaces with the network management system (not shown for clarity) for initiating tenant level actions such as, for example, initial deployment, resource allocation and removal.

In some embodiments, shadow manager 320-SM interfaces with the cloud manager (e.g., cloud manager 180 of FIG. 1).

In some embodiments, shadow manager 320-SM interfaces manages cloud-internal network resources including, for example ensuring a unique VLAN tagged interface per tenant Instance, and an unique IPV4 IP address to be used for communication between the shadow manager 320-SM and one of the shadow agents 320-SA (e.g., a root VM of a tenant instance).

In some embodiments, shadow manager 320-SM unifies usage of the features (e.g., VmWare vSphere) for tenant instances.

In some embodiments of shadow agents 330, shadow agents 330-SA are configured in the root VM (e.g., VM 240-0 of FIG. 2).

In some embodiments of shadow agents 330-SA, shadow agents 330-SA may be included in a number of the virtual machines created to provide cloud element functionality (e.g., two or more of VMs 240 of FIG. 2).

It should be appreciated that though illustrated as one program or module executing on an apparatus (e.g., shadow manager 320-SM executing on cloud element manager 320), there may be more programs or modules performing the described functions and one or more of the programs or modules may reside or execute remotely.

Figure 4:
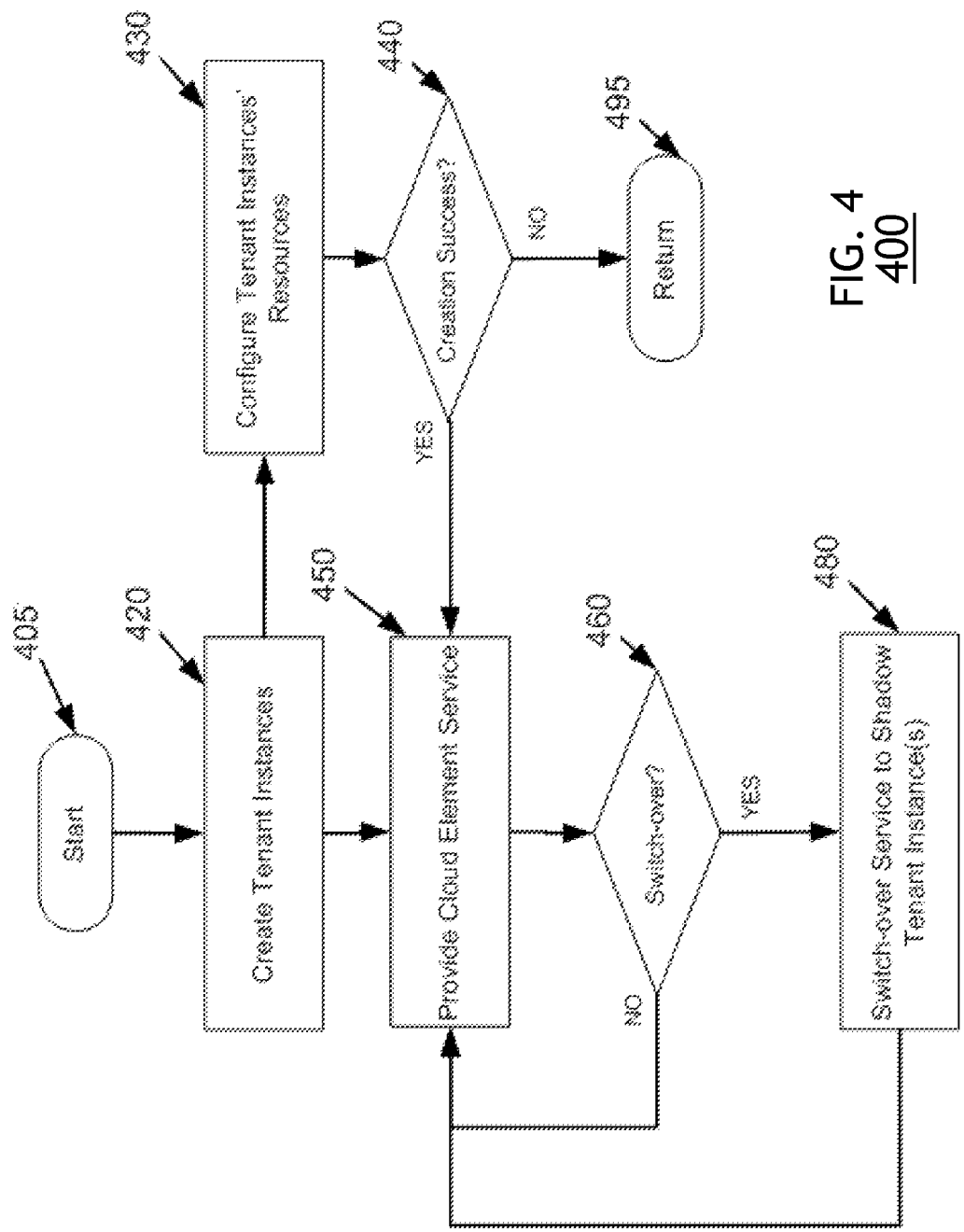
FIG. 4 depicts a flow chart illustrating an embodiment of a method 400 for a cloud element manager (e.g., cloud element manager 120 of FIG. 1) to configure a cloud element system.

FIG. 4 depicts a flow chart illustrating an embodiment of a method 400 for a cloud element system (e.g., cloud element system 110 of FIG. 1) to provide a redundant cloud element. The method begins at step 405 and includes: creating the at least one service providing tenant instance and at least one shadow tenant instance, the tenant instances configured to function as a cloud element (step 420); configuring tenant instances' resources (step 430); determining that the tenant instances were successfully created; (step 440); if the tenant resources were successfully created, providing cloud element services (step 450) or optionally ending the method if the tenant resources were not successfully created (step 495); determining a switch-over event (step 460); and if there is a switch-over event, switching over service from at least one of the service providing tenant instances to the one or more shadow tenant instance(s) (step 480).

In the method 400, the step 420 includes creating the at least one service providing tenant instance and at least one shadow tenant instance, the tenant instances configured to function as a cloud element (e.g., by cloud element manager 120 of FIG. 1). For example, referring to FIG. 1, the cloud element manager 120 creates tenant instances 130. Cloud element manager may create tenant instances in any suitable manner such as: (i) sending a message to a tenant instance (e.g., sending a message to a root VM of one or more tenant instance(s); (ii) sending a message to a resource manager in a data center to create and configure one or more tenant instance(s) (e.g., configuring data center resources to create the one or more tenant instances); (iii) performing resource allocation to create the one or more tenant instance(s); or (iv) the like.

As described herein, terms such as "create", "configure", "reconfigure", "provision" and "store" should be broadly construed to include transmitted messages or directives to implement the appropriate action.

In the method 400, the step 430 configuring tenant instances' resources (e.g., by one or more of tenant instances 130 of FIG. 1). Tenant instance resources may be configured in any suitable manner such as using conventional cloud orchestration approaches or by using a VM root approach as described in FIG. 2.

The method 400 optionally includes step 440. Step 440 includes receiving a status message indicating successful creation of the one or more tenant instances (e.g., receiving by cloud element manager 120 of FIG. 1 a status message from one or more tenant instances 130 of FIG. 1 or from a cloud orchestration manager). If a status indicating successful creation of the tenant instances is received the method proceeds to step 450. If a status message indicating that the tenant instances were not successfully created is received, the method optionally proceeds to step 495 and ends.

In the method 400, the step 450 includes providing cloud element services (e.g., cloud element manager 120 or one of tenant instances 130 providing cloud element services to network 170 of FIG. 1). In particular, the cloud element system (e.g., cloud element system 110 of FIG. 1) provides the functionality of the configured cloud element (e.g., a RNC in 3G telecom network).

In the method 400, the step 460 includes determining a switch-over event (e.g., by cloud element manager 120 of FIG. 1). In particular, a switch-over event indicates that the cloud element manager is to switch operation from the one or more service providing tenant instances to one or more of the shadow tenant instances. If a switch-over event is determined, the method proceeds to step 470, else the method returns to step 450. A switch-over event may be any suitable event and may be determined by the apparatus performing the method using any suitable method. For example, a switch-over event may be: (i) an indication to perform a graceful reset of the tenant (e.g., received from OAM 160 of FIG. 1); (ii) an indication of a software upgrade of tenant applications (e.g., received from OAM 160 of FIG. 1); (iii) an indication of a tenant configuration change (e.g., received from OAM 160 of FIG. 1); (iv) an indication of a tenant virtual machine change (e.g., received from OAM 160 of FIG. 1); (v) an indication to migrate a tenant instance (e.g., for purposes of geo-redundancy (e.g., received from OAM 160 of FIG. 1); or (vi) the like. It should be appreciated that the step 460 may be configured as a trigger or interrupt and thus, step 460 may only be implemented when a switch-over event is determined (e.g., triggered or causes an interrupt).

In the method 400, the step 480 includes switching over one or more shadow tenant instance(s) (e.g., by cloud element manager 120 or one or more of tenant instances 130 of FIG. 1). In particular, operation of the cloud element is switched from the one or more service providing tenant instances to one or more of the shadow tenant instances.

In some embodiments of the step 420, 430 or 440, the shadow tenant instance may be created after the service providing tenant instance. In some of these embodiments, the shadow tenant instance may be created after steps 420, 430 or 440 have been performed to create the service providing tenant instance or after the service providing tenant instance has been providing cloud element services in step 450. In some of these embodiments, the shadow tenant instance is created as needed. For example, for a software upgrade application, a shadow tenant instance may be created after a determination is made that the cloud element system will undergo a software upgrade.

In some embodiments of step 440, the cloud element manager may receive a status indicating that the one or more tenant instances were not created successfully. In some of these embodiments, the status includes available resource information. In some of these embodiments, the cloud element manager performing the step may perform any suitable action based on the received status such as: (i) retry creating the tenant instances using the same resources (e.g., retrying step 420); (ii) retry creating the tenant instances using at least one set of different resources (e.g., creating at least one of the tenant instances in a different data center) (e.g., retrying step 420); (iii) retry creating the tenant instances using different parameters (e.g., changing the resource requirements of at least one of the tenant instances based on the received available resource information) (e.g., retrying step 420); (iv) sending an alert message; (v) ending (e.g., step 495); or (vi) the like.

In some embodiments of the step 450, the cloud element manager (e.g., cloud element manager 120 of FIG. 1) orchestrates the shadow operations or is responsible for interfacing with the operator actions (e.g., via messages from a management system such as Alcatel-Lucent lightRadio™ management system).

In some embodiments of the step 450, the cloud element manager interfaces with one or more network elements (NEs) such as an RNC in a 3G telecom network or a BSC in a 2G telecom network.

In some of these embodiments of the step 450, one or more of tenant instance(s) perform the functionality of the cloud element manager as directed by the cloud element manager.

Figure 5:
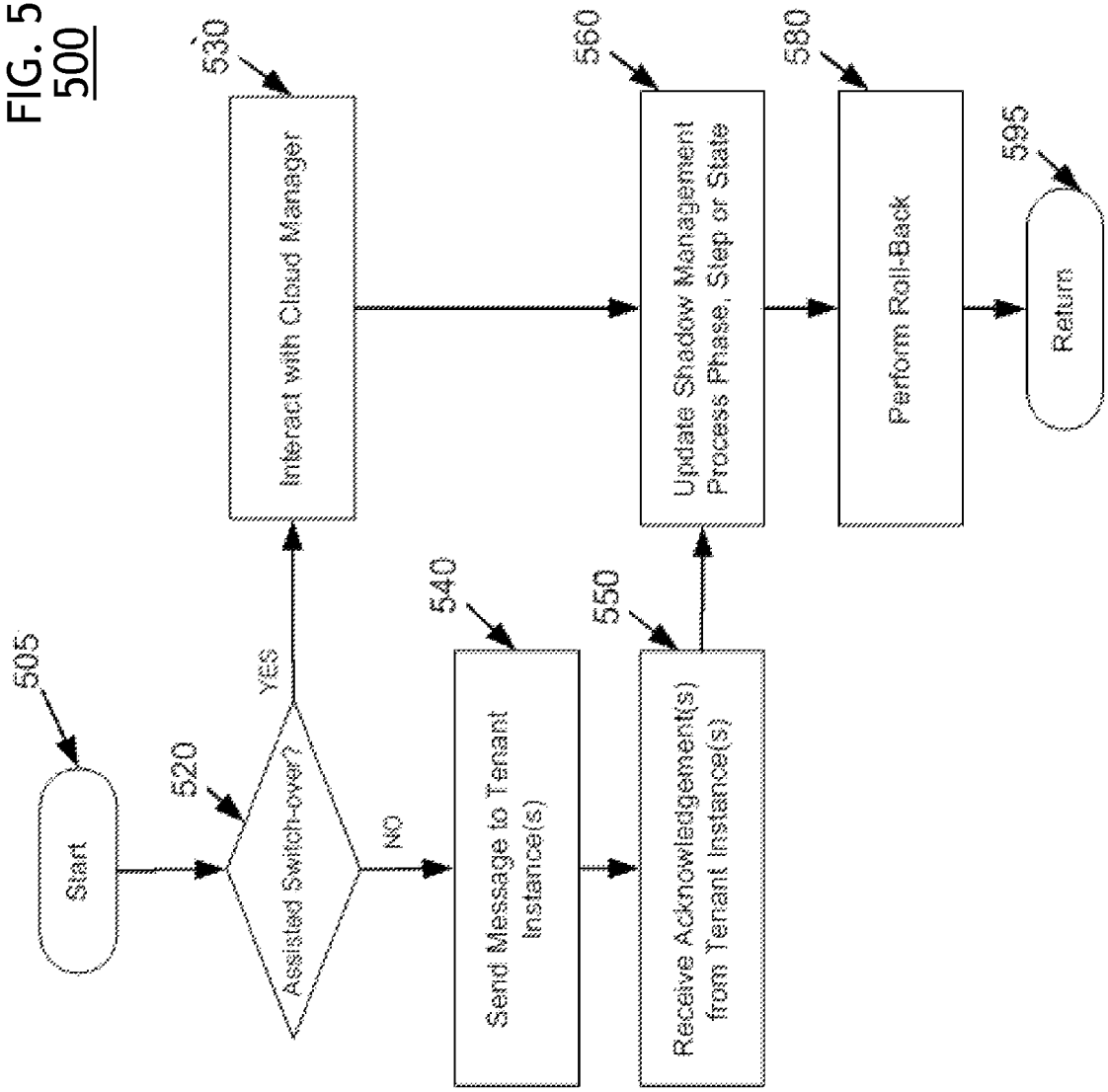
FIG. 5 depicts a flow chart illustrating an embodiment of a method 500 for switching over one or more shadow tenant instance(s) as illustrated in step 480 of FIG. 4.

FIG. 5 depicts a flow chart illustrating an embodiment of a method 500 for switching over one or more shadow tenant instance(s) as illustrated in step 480 of FIG. 4. The method begins and step 505 and includes: determining whether to perform an assisted switch-over (step 520); and if the determination is to perform an assisted switch-over the method proceeds to step 530, else the method proceeds to step 540. The method of performing an assisted switch-over includes: interacting with the cloud manager (step 530), while the method of performing an unassisted switch-over includes: sending message(s) to tenant instance(s) (step 540); and receiving acknowledgement(s) from the tenant instance(s) (step 550). Both assisted and unassisted switch-over method then proceed to step 560 where the method includes: optionally updating shadow management process phase, step or state (step 560) and optionally performing a roll-back (step 580). The method ends at step 595.

In the method 500, the step 520 includes determining whether to perform an assisted switch-over. If the determination is to perform an assisted switch-over the method proceeds to step 530, else the method proceeds to step 540.

In the method 500, the step 530 includes interacting with the cloud manager (e.g., cloud element manager 120 interacting with cloud manager 180 of FIG. 1). In particular, directives are sent to the cloud manager causing the cloud manager to configure one or more of the service providing tenant instance(s) to cease providing cloud element services and to configure one or more of the shadow tenant instance(s) to provide cloud element services. In some embodiments, acknowledgment messages indicating whether the directives were successfully executed are received from the cloud manager. The method then proceeds to step 560

In the method 500, the step 540 includes sending messages to tenant instance(s) (e.g., by cloud element manager 120 of FIG. 1). In particular, a message is sent to one or more of the service providing tenant instance(s) to cease providing cloud element services and a message is sent to one or more of the shadow tenant instances to provide cloud element services.

In the method 500, the step 550 optionally includes receiving acknowledgement messages to tenant instance(s) (e.g., by cloud element manager 120 of FIG. 1). In particular, acknowledgment messages indicate whether the tenant instance message was successfully executed (e.g., whether the service providing tenant instance has successfully ceased providing cloud element services or whether the shadow tenant instance has successfully configured to provide cloud element services).

In the method 500, the step 560 optionally includes updating the shadow management process phase, step or state (e.g., by cloud element manager 120 of FIG. 1). In particular, if the after or during the method a shadow management process phase, step or state has changed, the apparatus performing the method updates the shadow management process phase, step or state as described above.

In the method 500, the step 580 optionally includes performing a roll-back (e.g., by cloud element manager 120 of FIG. 1). In particular, if a switch-over has detected a roll-back condition, the method may determine to roll-back the cloud element system to the previous configuration. A roll-back condition may be any suitable condition such as, for example, the switch-over failed or the switch-over has created a performance degradation.

In the method 500, it should be appreciated that the method may provide only assisted or unassisted switch-over and as such, step 520 may be optional and either steps 540 and 550 or step 530 may be optional. For example, if an apparatus performing the method only provides the unassisted switch-over functionality, the method may not include steps 520 or 530. Similarly, if an apparatus performing the method only provides the assisted switch-over functionality, the method may not include steps 520 or 540 and 550.

In some embodiments of the steps 530 or 540, cloud element services are ceased by reconfiguring the external network interface(s) of the tenant instance. In some of these embodiments, the network interface(s) is switched to a dummy VLAN that is closed within the WCE.

In some of the embodiments of the steps 530 or 540, cloud element services are provided by reconfiguring the external network interface(s) of the tenant instance.

In some embodiments of the step 540 and 550, an acknowledgement that services provided by the one or more service providing tenant instances have been successfully ceased is received (e.g., in step 550) before sending a message to the one or more shadow tenant instances to provide cloud element services (e.g., in step 540). It should be appreciated that there will be a momentary outage between when the service providing tenant instances have been stopped and when the shadow tenant instance(s) have been configured to provide cloud element services. Advantageously, outage time may be essentially the same regardless of the number of resources (e.g., virtual machines) configured the tenant instance.

In some embodiments of the step 550, the acknowledgment message includes additional information in addition to the indication of whether the tenant instance message was successfully executed. The additional information may be any suitable information such as, for example: (i) a failure message (e.g., information as to why the tenant instance message failed to successfully execute such as lack of availability of required resources or of a failure condition); (ii) remediation information (e.g., information on a configuration that the tenant instance may successfully execute); or (iii) the like.

In some embodiments of the step 560, the apparatus performing the method may remove the previous service providing tenant instance.

In some embodiments of the step 580, the roll-back includes performing a switch-over returning the previous service providing tenant instance to its prior state of providing cloud element services and returning the previous shadow tenant instance to its previous state (e.g., cease providing cloud element services by the previous shadow tenant instance). For example, if a shadow tenant instance is provisioned to include a software upgrade and after the switch-over the new service providing tenant instance (e.g., the previous shadow tenant instance before the switch-over) is exhibiting a performance degradation or a failure, the cloud element manager may perform a switch-over to return the previous service providing tenant instance to its prior state of providing cloud element services in order to alleviate the failure or service degradation.

Although primarily depicted and described in a particular sequence, it should be appreciated that the steps shown in methods 400 and 500 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 6:
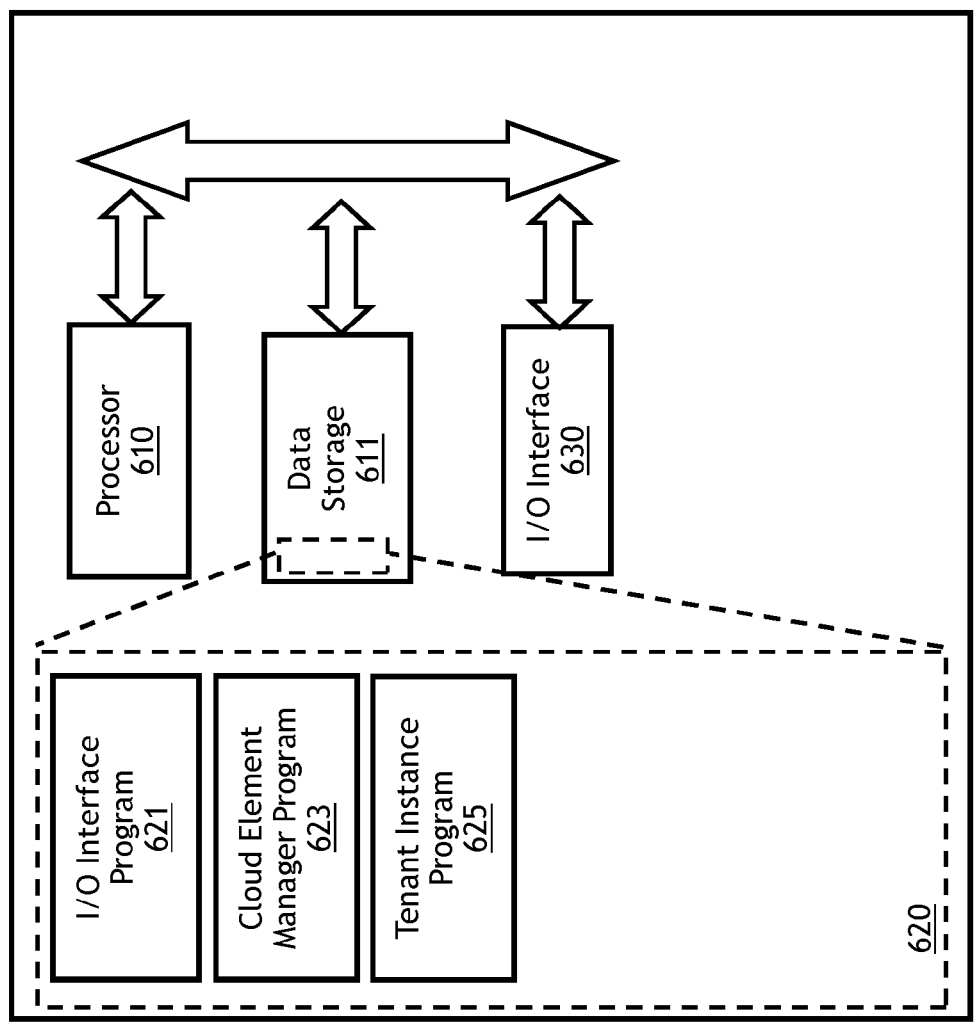
FIG. 6 schematically illustrates an embodiment of various apparatus 600 such as cloud element manager 120 or one of tenant instances 130 of FIG. 1.

FIG. 6 schematically illustrates an embodiment of various apparatus 600 such as cloud element manager 120 or one of tenant instances 130 of FIG. 1. The apparatus 600 includes a processor 610, a data storage 611, and optionally an I/O interface 630.

The processor 610 controls the operation of the apparatus 600. The processor 610 cooperates with the data storage 611.

The data storage 611 stores programs 620 executable by the processor 610. Data storage 611 may also optionally store program data such as shadow management process phase, step or state information, shadow management state machine(s), or the like as appropriate.

The processor-executable programs 620 may include an I/O interface program 621, a cloud element manager program 623 (e.g., including the shadow manager 320-SM of FIG. 3), or a tenant instance program 625 (e.g., including the shadow agents 330-SA of FIG. 3). Processor 610 cooperates with processor-executable programs 620.

The I/O interface 630 cooperates with processor 610 and I/O interface program 621 to support communications over links 125 of FIG. 1 as described above. The I/O interface program 621 performs one or more of the steps of 420, 440, 450, 460, or 480 of FIG. 4 or steps 530, 540 or 550 of FIG. 5 as described above and as appropriate.

The cloud element manager program 623 performs one or more of the steps of step 420, 440, 450, 460 or 480 of FIG. 4 or the steps of FIG. 5 as described above and as appropriate.

The tenant instance program 625 performs one or more of the steps of step 430, 440, 450 or 480 of FIG. 2 as described above and as appropriate.

In some embodiments, the processor 610 may include resources such as processors/CPU cores, the I/O interface 630 may include any suitable network interfaces, or the data storage 611 may include memory or storage devices. Moreover the apparatus 400 may be any suitable physical hardware configuration such as: one or more server(s), blades consisting of components such as processor, memory, network interfaces or storage devices. In some of these embodiments, the apparatus 600 may include cloud network resources that are remote from each other.

In some embodiments, the apparatus 600 may be one or more virtual machine (s). In some of these embodiments, one or more of the virtual machine(s) may include components from different machines or be geographically dispersed. For example, the data storage 611 and the processor 610 may be in two different physical machines.

When processor-executable programs 620 are implemented on a processor 610, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing tenant redundancy, the apparatus comprising:
 a data storage; and
 a processor communicatively connected to the data storage, the processor being configured to:
  create a service providing tenant instance, the service providing tenant instance being configured to:
   communicatively connect to a network providing a network service; and
   provide a cloud element service associated with the network service;
  create a shadow tenant instance, the shadow tenant instance being configured to:
   be communicatively hidden from the network; and
   provide the cloud element service associated with the network service;
  determine whether a trigger or interrupt has occurred which is an indication of a switch-over event;
  determine whether to switch over handling of the cloud element service, and
  switch over handling of the cloud element service from the service providing tenant instance to the shadow tenant instance based on determining whether the trigger or interrupt has occurred.

2. The apparatus of claim 1, wherein the service providing instance is configured with a first plurality of resources and the shadow tenant instance is configured with a second plurality of resources; and wherein the second plurality of resources comprises substantially less resources than the first plurality of resources.

3. The apparatus of claim 1, wherein the service providing instance is configured with a first plurality of virtual machines, the first plurality of virtual machines comprising a first root virtual machine and the shadow tenant instance is configured with a second plurality of virtual machines, the second plurality of virtual machines comprising a second root virtual machine.

4. The apparatus of claim 3, wherein the first root virtual machine is configured to translate one or more first application requirements into a first configuration of the first plurality of virtual machines and the second root virtual machine is configured to translate one or more second application requirements into a second configuration of the second plurality of virtual machines.

5. The apparatus of claim 3, wherein the first root virtual machine is configured to monitor a plurality of first load levels associated with at least a portion of the first plurality of virtual machines and control elasticity of the first plurality of virtual machines based on at least a portion of the plurality of first load levels and the second root virtual machine is configured to monitor a plurality of second load levels associated with at least a portion of the second plurality of virtual machines and control elasticity of the second plurality of virtual machines based on at least a portion of the plurality of second load levels.

6. The apparatus of claim 1, wherein the processor is further configured to:
   determine a roll-back condition; and
   roll-back the switch over.

7. The apparatus of claim 1, wherein the processor is further configured to:
   control a transition from at least one of:
      a first shadow management phase to a second shadow management phase; or
      a first shadow management step to a second shadow management step.

8. The apparatus of claim 7, wherein the transition control comprises at least one of configuring the processor to:
   synchronize the service providing tenant instance and the shadow tenant instance with the second shadow management phase; or
   synchronize the service providing tenant instance and the shadow tenant instance with the second shadow management step.

9. The apparatus of claim 8, wherein the transition control further comprises configuring the processor to:
   send a first shadow action plan to the service providing tenant instance; and
   send a second shadow action plan to the shadow tenant instance.

10. The apparatus of claim 7, wherein the processor is further configured to:
   receive an input from at least one of a network element or an external management system;
   wherein the control of the transition is based on the input.

11. The apparatus of claim 1, wherein the switch over handling of the cloud element service comprises configuring the processor to:
   communicatively hide the service providing tenant instance from the network; and
   communicatively connect the shadow tenant instance to the network.

12. The apparatus of claim 11, wherein communicatively hiding the service provide instance comprises configuring the processor to:
   switch at least one of the network interfaces of the service providing tenant instance to a dummy VLAN.

13. A system for providing tenant redundancy, the system comprising:
   a cloud element manager;
   a service providing tenant instance communicatively connected to the cloud element manager, the service providing instance being configured to:
      communicatively connect to a network providing a network service; and
      provide a cloud element service associated with the network service; and
   a shadow tenant instance communicatively connected to the cloud element manager, the shadow tenant instance being configured to:
      be communicatively hidden from the network; and
      provide the cloud element service associated with the network service;
   wherein the cloud element manager is configured to:
      create the service providing tenant instance and the shadow tenant instance;
      determine whether a trigger or interrupt has occurred which is an indication of a switch-over event;
      determine whether to switch over handling of the cloud element service, and
      switch over handling of the cloud element service from the service providing tenant instance to the shadow tenant instance based on determining whether a trigger or interrupt has occurred.

14. The system of claim 13, wherein the cloud element manager is further configured to:
   send a first shadow action plan to the service providing tenant instance; and
   send a second shadow action plan to the shadow tenant instance;
   wherein the service providing tenant instance is configured to invoke one or more first actions based on the first shadow action plan; and
   wherein the shadow tenant instance is configured to invoke one or more second actions based on the second shadow action plan.

15. The system of claim 13, wherein the switch over handling of the cloud element service comprises configuring the cloud element manager to:
   communicatively hide the service providing tenant instance from the network; and
   communicatively connect the shadow tenant instance to the network.

16. The system of claim 13, wherein communicatively hiding the service provide instance comprises configuring the cloud element manager to:
   switch at least one of the network interfaces of the service providing tenant instance to a dummy VLAN.

17. A method for providing tenant redundancy, the method comprising:
   at a processor communicatively connected to a data storage, creating a service providing tenant instance, the service providing tenant instance being configured to:
      communicatively connect to a network providing a network service; and provide a cloud element service associated with the network service;

creating, by the processor in cooperation with the data storage, a shadow tenant instance, the shadow tenant instance being configured to:
  be communicatively hidden from the network; and
  provide the cloud element service associated with the network service;

determining, by the processor in cooperation with the data storage, whether a trigger or interrupt has occurred which is an indication of a switch-over event;

determining, by the processor in cooperation with the data storage, whether to switch over handling of the cloud element service, and switching over handling, by the processor in cooperation with the data storage, of the cloud element service from the service providing tenant instance to the shadow tenant instance based on determining whether a trigger or interrupt has occurred.

18. The method of claim 17, wherein the service providing instance is configured with a first plurality of resources and the shadow tenant instance is configured with a second plurality of resources; and wherein the second plurality of resources comprises substantially less resources than the first plurality of resources.

19. The method of claim 17, wherein the service providing instance is configured with a first plurality of virtual machines, the first plurality of virtual machines comprising a first root virtual machine and the shadow tenant instance is configured with a second plurality of virtual machines, the second plurality of virtual machines comprising a second root virtual machine.

20. The method of claim 19, wherein the first root virtual machine is configured to translate one or more first application requirements into a first configuration of the first plurality of virtual machines and the second root virtual machine is configured to translate one or more second application requirements into a second configuration of the second plurality of virtual machines.

21. A non-transitory computer-readable storage medium storing instructions which, when executed by a computer, cause the computer to perform a method, the method comprising:

creating a service providing tenant instance, the service providing tenant instance being configured to:
  communicatively connect to a network providing a network service; and
  provide a cloud element service associated with the network service;

creating a shadow tenant instance, the shadow tenant instance being configured to:
  be communicatively hidden from the network; and
  provide the cloud element service associated with the network service;

determining whether a trigger or interrupt has occurred which is an indication of a switch-over event;

determining whether to switch over handling of the cloud element service, and switching over handling of the cloud element service from the service providing tenant instance to the shadow tenant instance based on determining whether a trigger or interrupt has occurred.

22. The apparatus of claim 1, wherein the service providing tenant instance and the shadow tenant instance are created before determination of the indication of a switch-over event.

23. The apparatus of claim 1, wherein the cloud element service provided by the shadow tenant instance has the functionality of the cloud element service provided by the service providing tenant instance.

* * * * *